United States Patent
Seely et al.

(10) Patent No.: US 10,419,350 B2
(45) Date of Patent: Sep. 17, 2019

(54) PACKET ADMISSION

(71) Applicant: Hewlett Packard Enterprise Development LP, Houston, TX (US)

(72) Inventors: Jonathan M. Seely, Roseville, CA (US); Eric J. Pelletier, San Francisco, CA (US); Brian Peter L'Ecuyer, Elk Grove, CA (US); Mark Shillingburg, Roseville, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/727,084

(22) Filed: Oct. 6, 2017

(65) Prior Publication Data
US 2019/0109792 A1    Apr. 11, 2019

(51) Int. Cl.
| | | |
|---|---|---|
| *H04L 12/813* | (2013.01) | |
| *H04L 12/803* | (2013.01) | |
| *H04L 12/911* | (2013.01) | |
| *H04L 12/931* | (2013.01) | |
| *H04L 12/851* | (2013.01) | |
| *H04L 12/823* | (2013.01) | |

(Continued)

(52) U.S. Cl.
CPC ............ *H04L 47/20* (2013.01); *H04L 47/125* (2013.01); *H04L 47/781* (2013.01); *H04L 47/783* (2013.01); *H04L 47/24* (2013.01); *H04L 47/32* (2013.01); *H04L 49/10* (2013.01); *H04L 49/503* (2013.01); *H04L 49/9084* (2013.01)

(58) Field of Classification Search
CPC ......... H04L 47/20; H04L 47/24; H04L 47/32; H04L 47/125; H04L 47/783; H04L 49/503; H04L 12/803; H04L 12/813; H04L 12/911; H04L 47/781; H04L 49/10; H04L 49/9084
See application file for complete search history.

(56) References Cited

U.S. PATENT DOCUMENTS 6,657,962 B1 *  12/2003  Barri .................... H04L 47/10
                                                    370/235
7,012,919 B1 *   3/2006  So ...................... H04L 41/5019
                                                    370/235

(Continued)

OTHER PUBLICATIONS

Mahmoud Elhaddad et al., "Traffic Shaping and Scheduling for OBS-based IP/WDM Backbones," Oct. 2003, University of Pittsburgh, Pennsylvania, USA, 12 pages.

*Primary Examiner* — Tri H Phan
(74) *Attorney, Agent, or Firm* — Sheppard Mullin Richter & Hampton (57) ABSTRACT

An example of a system may include a processing resource and a controller including a memory resource storing instructions executable by the processing resource to determine a rate of traffic communication at each of a plurality of ingresses participating in a communication of a packet flow context, determine a rate of traffic communication at each of a plurality of egresses participating in the communication of the packet flow context, determine a target packet admission rate applicable to each of the plurality of ingresses from the rate of traffic communication at each of the plurality of ingresses and the rate of traffic communication at each of the plurality of egresses, and communicate the target packet admission rate to an ingress of the plurality of ingresses.

20 Claims, 4 Drawing Sheets

(51) Int. Cl.
*H04L 12/933* (2013.01)
*H04L 12/861* (2013.01)

(56) References Cited

U.S. PATENT DOCUMENTS

| | | | |
|---|---|---|---|
| 7,088,710 | B1 | 8/2006 | Johnson et al. |
| 7,719,982 | B2 | 5/2010 | Varma |
| 8,687,491 | B2 * | 4/2014 | Kucharczyk ............ H04L 47/30 |
| | | | 370/235 |
| 8,817,807 | B2 * | 8/2014 | Suzuki .................... H04L 12/54 |
| | | | 370/428 |
| 8,923,122 | B2 | 12/2014 | Anand et al. |
| 9,769,074 | B2 * | 9/2017 | DeCusatis ............... H04L 47/12 |
| 9,866,408 | B2 * | 1/2018 | Latham ............... H04L 41/0806 |
| 2003/0058802 | A1 | 3/2003 | Jones et al. |
| 2004/0114583 | A1 | 6/2004 | Cetin et al. |
| 2005/0185582 | A1 | 8/2005 | Wybenga et al. |
| 2006/0133270 | A1 | 6/2006 | Lee |
| 2013/0329577 | A1 | 12/2013 | Suzuki et al. |
| 2014/0022901 | A1 | 1/2014 | Suzuki et al. |
| 2014/0126396 | A1 * | 5/2014 | Matthews ............ H04L 43/065 |
| | | | 370/252 |
| 2014/0269319 | A1 * | 9/2014 | DeCusatis ............... H04L 47/12 |
| | | | 370/236 |
| 2017/0230301 | A1 * | 8/2017 | Szymanski ............ H04L 47/14 |
| 2018/0048575 | A1 * | 2/2018 | Mangin .................. H04L 47/32 |
| 2018/0310078 | A1 * | 10/2018 | Szymanski ............ H04L 47/56 |

* cited by examiner

PACKET ADMISSION

BACKGROUND

A network may transfer information from a source to a destination. The network may route the information from ingress nodes to egress nodes. Mechanisms to monitor and influence the flow of information across the network may be utilized to monitor and influence the performance of the network.

DETAILED DESCRIPTION

A network may include a computing network. The network may include a data network including a digital telecommunications network to facilitate the sharing of resources among nodes, such as computing devices, connected to the network. The nodes may be able to exchange data, such as addressed data packets. As used herein a data packet may include a formatted unit of data such as a list of bits or bytes carried by a packet-switched network. The data packets may include a header and a payload and the header may be utilized by network hardware to direct the packet to its destination.

The nodes connected to the network may transmit packets through data link channels between the nodes. The data link may employ a variety of link layer technologies. In some examples, the network may utilize an Ethernet link layer technology for communicating packets among nodes. The data link may include an interconnect fabric such as wired and/or wireless data link connecting nodes. The interconnect fabric may have a variety of distinct architectures to accomplish the network of connections. Portions of the interconnect fabric of the network may be contained within and/or connected to a network switch.

The interconnect fabric may include a switched fabric in which network nodes interconnect via one or more network switches. A switched fabric network topology may interconnect nodes via one or more network switches such as crossbar switched and may spread network traffic across multiple physical links. The fabric may include Ethernet fabric. An Ethernet fabric may include network topologies utilized in local area networks (LAN), wide area networks (WAN), etc. Ethernet fabric may use twisted pair and or fiber optic links in conjunction with hubs or switched to transfer data among attached nodes.

The network may utilize network switches to connect nodes and route packets between the nodes. A network switch may include a computing device that connects nodes such as computing devices together on the network by carrying out packet switching to receive, process, and forward data to nodes that are supposed to receive it instead of broadcasting the same data out to many nodes that are not the target of the data. The network switch may include an Ethernet network switch.

In addition to the interconnect fabric, the network switch may include an ingress and an egress. An ingress may include an ingress interface where a packet from a source node arrives at and eventually enters the switch. The egress may include an egress interface where a packet exits the network switch.

The network switch may utilize a variety of Ethernet queueing fabrics. For example, the network switch may utilize different classes of interconnect fabric architectures or topologies. In an example, the network switch may utilize a fully connected distributed crossbar interconnect fabric topology. A fully connected distributed crossbar interconnect fabric may include a crossbar switch with multiple input and output lines that form a crossed pattern of interconnecting lines between which a connection may be established by closing a switch located at each intersection. A fully connected distributed crossbar interconnect fabric may consist literally of crossing metal bars that provided the input and output paths. However, a fully connected distributed crossbar interconnect fabric may include the same switching topology in solid state semiconductor chips. In another example, the network switch may utilize ad hoc distributed switch interconnect fabric topology.

The network switch may utilize an unscheduled and lightly buffered Ethernet queueing fabric. Unscheduled and lightly buffered systems may avoid scheduling one type of network traffic over another and may make the determination of whether to admit or drop traffic at the ingress without considering other traffic conditions in the network.

Conversely, the network switch may utilize a scheduled and deeply buffered virtual output queue (VOQ) Ethernet queueing fabric. The VOQ systems may prioritize traffic and may employ larger buffers than the unscheduled system. VOQ systems may be expensive and be increasingly impractical with scale because of the increased amount of inputs they consider in controlling the flow of traffic, such as how full an egress buffer is at a particular time.

In contrast, examples of the present disclosure may include systems, methods, and machine-readable media for packet admission that consider local and global conditions providing high granularity of traffic prioritization. The examples of the present disclosure may simultaneously reduce bandwidth consumed by monitoring the local and global conditions and may reducing buffer consumption. For example, a system may include a processing resource and a controller including a memory resource storing instructions executable by the processing resource. The instructions may be executable by the processing resource to determine a rate of traffic communication at each of a plurality of ingresses participating in a communication of a packet flow context; determine a rate of traffic communication at each of a plurality of egresses participating in the communication of the packet flow context; determine a target packet admission rate applicable to each of the plurality of ingresses; and communicate the target packet admission rate to an ingress of the plurality of ingresses.

Figure 1A:
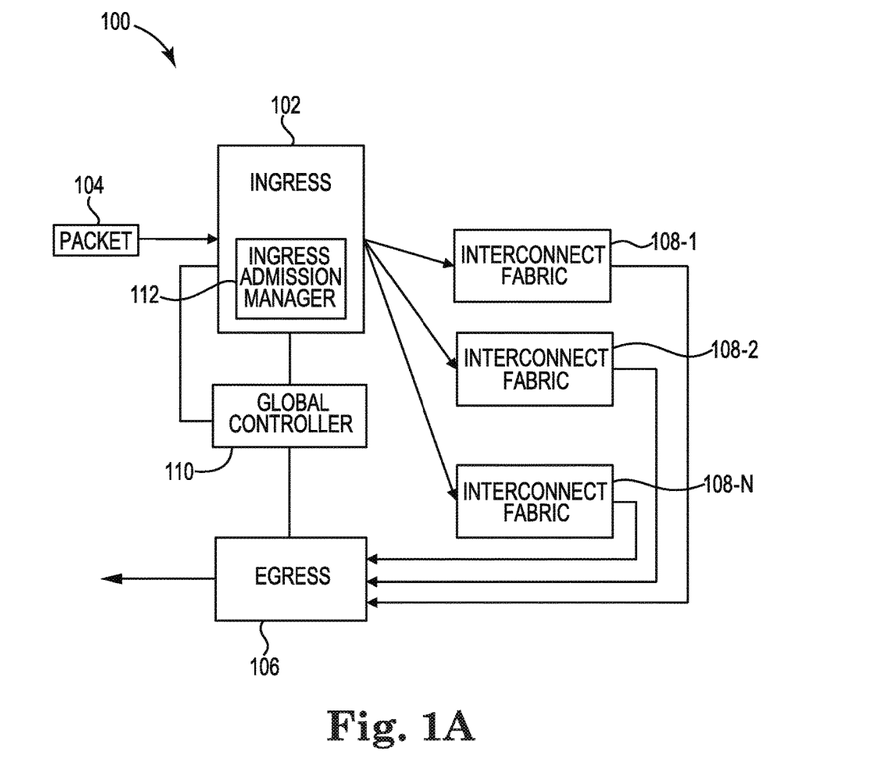
FIG. 1A illustrates an example of a system for packet admission consistent with the disclosure.

FIG. 1A illustrates an example of a system 100 for packet admission consistent with the disclosure. The system 100 may include a switch (e.g., an Ethernet switch) and/or a network of switches. The system 100 may include an ingress 102. The ingress 102 may include an interface where a packet 104 may enter a switch and/or a network of switches. The packet 104 may be a packet 104 coming from a source node and destined for a destination node downstream in the network of switches. As used herein, packet 104 may refer to a unit of data that is routed between a source node, such as a source computing device, and a destination node, such as a destination computing device, on a packet-switched network. That is, a packet 104 may include a chunk of a larger communication of data such as a computing file. However, as used herein, packet 104 may also refer to a packet flow such as a traffic flow or network flow of a sequence of individual packet units sent from a source node to a destination node. That is, the packet 104 may refer to a group of packets comprising the entirety of a specific network traffic transport, media stream, computing file etc. and/or the individual constituent packet units thereof.

The packet 104 may include and/or belong to a context. A context may include an identifying characteristic of the packet 104 and/or a type associated with the packet 104. For example, the context of a packet 104 may include an identity of a source or destination of the packet 104, a file type of the packet 104, an application type associated with the packet 104, a specific communication session associated with the packet 104, etc. Multiple packets 104 may have the same packet context where the multiple packets 104 are of a common type and/or have common identifying characteristics.

The ingress 102 may include an ingress metering and/or policing manager. The metering and/or policing manager may meter and or police incoming packets 104 arriving at the ingress 102. For example, metering and/or policing may include monitoring, counting, classifying, sorting, prioritizing, and/or filtering incoming packets 104 into an ingress queue.

The ingress 102 may include an ingress queue. The ingress queue may utilize a portion of a physical buffer maintained at the ingress 102 to store incoming packets 104. The ingress queue may store incoming packets 104 at the ingress buffer until there is storage space and/or processing bandwidth available at an egress 106 that packet 104 is being routed to. The ingress queue may include a virtual output queue. A virtual output queue may be part of a virtual output queue system where each ingress 102 maintains a separate virtual queue for each egress 106.

The ingress 102 may include an ingress scheduler. The ingress scheduler may schedule, direct, and/or initiate the transfer of an incoming packet 104 across the interconnect fabric 108-1 . . . 108-N. The ingress scheduler may route the packet across a specific channel of the interconnect fabric 108-1 . . . 108-N to arrive at a specific egress 106 identified based on a header of the packet 104.

The system 100 may include an interconnect fabric 108-1 . . . 108-N. The interconnect fabric 108-1 . . . 108-N may include fully connected distributed crossbars and/or ad hoc fabric topologies. The interconnect fabric 108-1 . . . 108-N may provide a data link between an ingress 102 and an egress 106 in a same network switch and/or across a plurality of network switches.

The system 100 may include an egress 106. The egress 106 may include an interface where a packet 104 may exit a network switch and/or a network of network switches. The egress 106 may be an interface with a destination node and/or it may be an interface with additional ingresses 102.

The egress 106 may include an egress arrival manager. The egress arrival manager. The egress arrival manager may monitor and/or track the arrival of packets 104 at the egress 106.

The egress 106 may include an egress queue. The egress queue may utilize a portion of a physical buffer maintained local to the egress 106 to store incoming packets 104 bound for the particular egress 106. The egress queue may store incoming packets 104 at the egress buffer until there is storage space and/or processing bandwidth available at an egress 106 that packet 104 is being routed to.

The egress 106 may include an egress scheduler. The egress scheduler may schedule, direct, and/or initiate the transfer of an incoming packet 104 to depart from the egress 106. The egress scheduler may route the packet to depart from a specific egress 106 identified based on a header of the packet 104.

The egress 106 may include an egress metering and/or policing manager. The egress metering and/or policing manager may meter and or police packets 104 coming from the egress queue on the way to departing the egress 106. For example, the egress metering and/or policing manager may monitor, count, classify, sort, prioritize and/or filter the packets 104 to depart the egress 106.

The system 100 may be utilized to engineer network traffic by utilizing information about the components of the system to control the flow of traffic across a network. The system may utilize an ingress admission manager 112 in engineering the network traffic. The ingress admission manager 112 may be local to the ingress 102. The ingress admission manager 112 may be a separate from or a part of the global controller 110 described below.

The ingress admission manager 112 may operate based on instructions. For example, the ingress admission manager 112 may utilize a processing resource to execute machine-readable instructions stored on a machine-readable media to cause the processing resource to perform actions and/or functions associated with monitoring network conditions and controlling the ingress of packets 104. In an example, monitoring the network conditions and controlling the admission of packets to ingress queues may be supported with a processing resource executing instructions from firmware of an Ethernet switch.

In other examples, the ingress admission manager 112 may include logic. As used herein, "logic" may be an alternative or additional processing resource to execute the actions and/or functions, etc., described herein, which includes hardware (e.g., various forms of transistor logic, application specific integrated circuits (ASICs), etc.), as opposed to computer executable instructions (e.g., software, firmware, etc.) stored in a memory and executable by a processor. It is presumed that logic similarly executes instructions for purposes of the embodiments of the present disclosure. In an example, the monitoring network conditions and controlling the ingress of packets 104 may be supported with logic.

In some examples, the ingress admission manager 112 may include a combination of logic and machine-readable instructions stored on a machine-readable media to cause a processing resource to perform actions and/or functions associated with monitoring network conditions and controlling the ingress of packets 104.

The ingress admission manager 112 may decide whether or not to admit an incoming packet 104 to an ingress 102. The ingress admission manager 112 may be associated with a particular ingress 102 of a plurality of ingresses. The ingress admission manager 112 may make decisions regarding whether or not to admit a packet 104 to the particular ingress 102. In an example, the incoming packet 104 may be placed into an ingress queue associated with the ingress 104 once admitted. The ingress admission manager 112 may base the decision whether or not to admit the incoming packet 104 to the ingress queue on data regarding traffic conditions that is collects and/or receives.

The ingress admission manager 112 may base its decision on local data (e.g., data collected at an ingress 102 making a packet admission decision) and global data (e.g., data collected from ingresses and/or egresses other than, distant to, and/or not in direct persistent communication of traffic conditions with the ingress 102 making the packet admission decision). For example, the ingress admission manager 112 may base its decision on a local attribute of an ingress traffic condition at the ingress 102. The ingress admission manager 112 may collect and/or receive a local attribute of a traffic condition for the ingress 102 for which it is making the packet admission decision. A local attribute of an ingress traffic condition may include an attribute of an ingress traffic condition occurring at and/or collected locally from the ingress 102. For example, a local attribute of ingress traffic condition may include a state and/or a rate of change of a state at the ingress 102. The state and/or rate of change of the state at the ingress 102 may be collected at the ingress 102 and/or from components of the ingress 102.

For example, a local attribute of an ingress traffic condition may include an arrival rate for a particular packet, a particular packet flow, and/or a particular packet flow context at an ingress 102. That is, the ingress policing and metering manager may communicate the quantity, type, and rate of arrival of packets 104 with a particular context entering the ingress 102 to the ingress admission manager 112.

In another example, the local attribute of an ingress traffic condition may include a depth statistic of the ingress queue. For example, the amount of packets 104 in an ingress queue, an amount of data present in an ingress queue, an amount of space in an ingress queue occupied by packets 104, an amount of space remaining available to be occupied by a packet 104 in the ingress queue, a state of the ingress queue, and/or a rate at which the ingress queue is filling or emptying of packets 104 may be communicated to or retrieved by the ingress admission manager 112. As used herein, the depth of an ingress queue may include the amount of packets currently waiting in the ingress queue to be communicated. The depth statistic may include not only the depth, but also information related to trends or the rate at which the depth of the ingress queue is changing.

In yet another example, the local attribute of an ingress traffic condition may include a locally determined state of the interconnect fabric 108-1 . . . 108-N. For example, the ingress scheduler local to the ingress 102 may communicate an amount of congestion and/or utilization of the interconnect fabric 108-1 . . . 108-N to the ingress admission manager 112. The ingress scheduler may, for example, communicate the amount of packets 104 being scheduled for traversal of the interconnect fabric 108-1 . . . 108-N, a consumed or remaining capacity of the ingress scheduler to schedule additional packets, a delay associated with sending the packets 104 across the interconnect fabric 108-1 . . . 108-N, a depth of an egress queue that the ingress scheduler is attempting to send a packet 104 to, and/or a rate at which the state of the ingress scheduler is changing. In general, the ingress scheduler may communicate, by sending indications of how busy it is, an indication of the congestion and/or utilization level of the interconnect fabric 108-1 . . . 108-N that it is attempting to utilize to send a packet 104 to an egress 106.

Additionally, a local attribute of an ingress traffic condition may be a combination of and/or calculated from the above-outlined examples of local attributes of an ingress traffic condition. That is, the ingress admission manager 112 may utilize the above-outlined examples of a local attribute of an ingress traffic condition to compile and/or calculate a separate local attribute of an ingress traffic condition that is indicative of the overall state of the ingress 102 in addition to its associated constituent components. In this manner, the local attribute of an ingress traffic condition may be utilized to locally determine a rate of traffic communication at the ingress 102. The locally determined rate of traffic communication may include a rate at which packets 104 are arriving at the ingress 102, the rate at which packets 104 are being placed into queues, the depth of the packets 104 at those queues, the rate at which the packets 104 are being scheduled and communicated across the interconnect fabric 108-1 . . . 108-N to a corresponding egress 106, thereby providing a metric of the conditions at the ingress 102 overall.

The system may include a global controller 110. The global controller 110 may be a separate component from and/or operate utilizing separate resources from the ingress admission manager 112. For example, the ingress admission manager 112 may be located at and/or executed at the ingress 102, while the global controller 110 may be located and/or executed elsewhere in a computing network. However, in some examples the ingress admission manager 112 may include the global controller 112.

The global controller 110 may operate based on instructions. For example, the global controller 110 may utilize a processing resource to execute machine-readable instructions stored on a machine-readable media to cause the processing resource to perform actions and/or functions associated with monitoring network conditions and controlling the ingress of packets 104. In an example, monitoring the network conditions and controlling the admission of packets 104 to ingress queues may be supported with a processing resource executing instructions from firmware of an Ethernet switch.

In other examples, the global controller 110 may include logic. As used herein, "logic" may be an alternative or additional processing resource to execute the actions and/or functions, etc., described herein, which includes hardware (e.g., various forms of transistor logic, application specific integrated circuits (ASICs), etc.), as opposed to computer executable instructions (e.g., software, firmware, etc.) stored in a memory and executable by a processor. It is presumed that logic similarly executes instructions for purposes of the embodiments of the present disclosure. In an example, the monitoring network conditions and controlling the ingress of packets 104 may be supported with logic.

In some examples, the global controller 110 may include a combination of logic and machine-readable instructions stored on a machine-readable media to cause a processing resource to perform actions and/or functions associated with monitoring network conditions and controlling the ingress of packets 104.

The global controller 110 may identify a context of a packet 104 arriving at an ingress 102. In some examples, the ingress admission manager 112 or other component of the ingress 102 may determine the context of the packet 104 and communicate the context to the global controller 110. The context of the packet 104 may be determined based on an analysis of the packet 104 and/or the metadata associated with the packet 104.

The global controller 110 may identify a plurality of ingresses 102 and egresses 106 that are participating in the communication of the packet context. An ingress 102 or egress 106 may be participating in the communication of the packet 104 when it is an ingress 102 or egress 106 that may participate in the communication of a packet 104 having the identified context across a network. If an ingress 102 or egress 106 is within a communication path between a source and/or a destination of the packet 104 and is designated as being able to process the particular context of the packet 104, then that ingress 102 or egress 106 may be identified as an ingress 102 or egress 106 that is participating in the communication of the packet 104. The ingress 102 or egress 106 may be identified as participating in the communication of a packet context without necessarily receiving, forwarding, or otherwise actually performing an operation to communicate the incoming packet 104 being considered for admission.

The global controller 110 may determine an ingress-specific rate of traffic communication utilizing global data. As used herein, global data may include data that is descriptive of conditions at and/or collected from across a plurality of ingresses participating in a communication of a packet context across a network. While the global data may include data that is local to each of the plurality of ingresses participating in the communication of the packet across the network, it may be global in the sense that it may be collected from the plurality of ingresses other than and even distant to the particular ingress at which a decision to admit a packet is being made. In this sense, the global data may include data that is providing a global view of traffic conditions at ingresses distant to an ingress where a packet admission decision is being made. Collectively, the global data from each of the plurality of ingresses participating in a communication of a packet context may provide a global view of traffic conditions across a plurality of ingresses participating in a communication of a packet context across a network. Local data, such as data collected at the ingress where a packet admission decision is being made, may not provide such a global view as its scope may be limited to the ingress where the packet admission decision is being made and/or ingresses in persistent direct communication of traffic conditions therewith.

For example, the global controller 110 may determine a rate of traffic communication at each of a plurality of ingresses participating in a communication of a packet context associated with the packet 104. The plurality of ingresses participating in a communication of a packet context associated with the packet 104 may determine a rate of traffic communication at ingresses in addition to the ingress where the incoming packet 104 arrived. The rate of traffic communication at each of the plurality of ingresses may be determined based on a periodic collection, by the global controller 110, of global data such as attributes of ingress traffic conditions from each of the plurality of ingresses participating in the communication of the packet flow context associated with the packet 104.

For example, determining a rate of traffic communication at each of a plurality of ingresses may include determining the rate of traffic communication at each of the plurality of ingresses based on an initial measurement of an attribute of an ingress traffic condition received from each of the plurality of ingresses and an updated measurement of the attribute a period of time after the initial measurement is received. A rate of traffic communication may provide a prediction of a trend in the ingress traffic condition through extrapolation of the mathematical relationship between the initial measurement and the updated measurement. The measurement of the attribute of ingress traffic conditions may be collected from and/or received from each of the plurality of ingresses with a slower cadence than a VoQ control loop that utilizes persistent substantially real-time updates of state information. Instead, the measurement of the attribute of ingress traffic conditions may be collected from and/or received from each of the plurality of ingresses at a many millisecond to multiple second frequency. The slower cadence may provide for reduced bandwidth consumption associated with communicating the measurement updates across the network and eliminating the strain on processing and/or storing resources in the network to rapidly and persistently process the persistent substantially real-time updates of state information. That is, a rate of traffic communication determined from a plurality of periodic measurements of an attribute of an ingress may reduce the amount of data associated with analyzing ingress traffic conditions.

An attribute of an ingress traffic condition at each of the plurality of ingresses may include a state at the plurality of ingresses. The state at each of the plurality of ingresses may be collected at each respective ingress participating in a communication of a packet flow context and/or from constituent components thereof. For example, the above-outlined examples of local attributes of an ingress traffic condition calculated by, received by, and/or collected by the ingress admission manager 112 associated with each of the plurality of ingresses participating in a communication of a packet flow context may additionally be communicated to the global controller 110 as attributes of an ingress traffic condition at each of the plurality of ingresses participating in a communication of a packet flow context. That is, the local attributes of an ingress traffic condition from each of a plurality of ingresses participating in a communication of a packet flow context may be collected at the global controller 110.

An example of an attribute of the ingress traffic condition that may be collected and/or received by the global controller 110 may include an arrival rate for a particular flow of packets and/or a combination of flows of packets at a corresponding ingress of the plurality of ingresses. An additional example of an attribute of the ingress traffic condition may include a depth statistic of an ingress queue at a corresponding ingress of the plurality of ingresses. Further, attribute of the ingress traffic condition may include a state of the interconnect fabric 108-1 . . . 108-N as determined locally at each of the plurality of ingresses of the network participating in the communication of the packet context. A state of the interconnect fabric 108-1 . . . 108-N may include an amount of interconnect fabric 108-1 . . . 108-N utilizations that is determined local to a corresponding ingress of the plurality of ingresses. Furthermore, an attribute of the ingress traffic condition may include an ingress departure rate of a packet flow from a corresponding ingress of the plurality of ingresses determined from an ingress scheduler of the corresponding ingress. The ingress departure rate may include a measurement of the rate at which packets are departing from the corresponding ingress. Additionally, the global controller 110 may collect an attribute of the ingress traffic condition that is a combination of and/or calculated from the above-outlined examples of ingress rate attributes.

The global controller 110 may, based on the attribute of the ingress traffic condition collected from each of a plurality of ingresses participating in a communication of a packet flow context, determine the rate of traffic communication at each of the plurality of ingresses participating in a communication of the packet context. For example, the global controller 110 may determine the rate in change of a state of each of the plurality of ingresses participating in a communication of a packet flow context in addition to the rate at which various types of packet contexts are arriving at and/or departing from each of the plurality of ingresses participating in a communication of a packet flow context.

Additionally, the global controller 110 may determine an egress-specific rate of traffic communication utilizing global data. As used herein, global data may include data that is descriptive of conditions at and/or collected from across a plurality of egresses participating in a communication of a packet context across a network. While the global data may include data that is local to each of the plurality of egresses participating in the communication of the packet across the network, it may be global in the sense that it may be collected from the plurality of egresses distant to and/or not engaged in direct persistent communication of traffic conditions with the particular ingress at which a decision to admit a packet is being made. In this sense, the global data may include data that is providing a global view of traffic conditions at egresses distant to an ingress where a packet admission decision is being made. Collectively, the global data from each of the plurality of egresses participating in a communication of a packet context may provide a global view of traffic conditions across a plurality of egresses participating in a communication of a packet context across a network. Local data, such as data collected at the ingress where a packet admission decision is being made, may not provide such a global view as its scope may be limited to the ingress where the packet admission decision is being made and/or egresses in persistent direct communication of traffic conditions therewith.

For example, the global controller 110 may determine a rate of traffic communication at each of a plurality of egresses participating in a communication of a packet context associated with the packet 104. The rate of traffic communication at each of the plurality of egresses may be determined based on a periodic collection, by the global controller 110, of global data such as attributes of egress traffic conditions from each of the plurality of egresses participating in the communication of the packet flow context associated with the packet 104.

For example, determining a rate of traffic communication at each of a plurality of egresses may include determining the rate of traffic communication at each of the plurality of egresses based on an initial measurement of an attribute of an egress traffic condition received from each of the plurality of ingresses and an updated measurement of the attribute a period of time after the initial measurement is received. A rate of traffic communication may provide a prediction of a trend in the egress traffic condition through extrapolation of the mathematical relationship between the initial measurement and the updated measurement. The measurements of the attribute of egress traffic conditions may be collected from and/or received from each of the plurality of egresses with a slower cadence than a VoQ control loop that utilizes persistent substantially real-time updates of state information. Instead, the measurement of the attribute of egress traffic conditions may be collected from and/or received from each of the plurality of egresses at a many millisecond to multiple second frequency. The slower cadence may provide for reduced bandwidth consumption associated with communicating the measurement updates across the network and eliminating the strain on processing and/or storing resources in the network to rapidly and persistently process the persistent substantially real-time updates of state information. That is, a rate of traffic communication determined from a plurality of periodic measurements of an attribute of an egress may reduce the amount of data associated with analyzing ingress traffic conditions.

An attribute of an egress traffic condition at each of the plurality of egresses may include a state at each of the plurality of ingresses. The state at each of the plurality of egresses may be collected at each respective egress participating in a communication of a packet flow context and/or from constituent components thereof. For example, each egress of the plurality of egresses participating in communicating the packet context may include an egress arrival manager. The egress arrival manager may calculate, collect, and/or receive the attributes of the egress traffic conditions for its egress and may communicate them to the global controller 110.

An example of an attribute of an egress traffic condition that may be collected and/or received by the global controller 110 may include an amount of data arriving at each of a plurality of egresses of a network participating in communicating the packet context. For example, the attribute of egress traffic condition may include the rate of the arrival of packets 104 at each of the plurality of egresses participating in communicating the packet context. An egress arrival manager associated with a particular egress of the plurality of egresses participating in communicating the packet context may communicate the amount of packets and/or the arrival rate of packets at the particular egress to the global controller 110. In this manner, the global controller 110 may determine the arrival rate of packets at each of the plurality egresses of a network participating in communicating the packet context, thereby imparting a global understanding of traffic conditions in the network with respect to communicating the packet context associated with the incoming packet 104.

In yet another example, the attribute of an egress traffic condition that may include an amount of packets departing each of the plurality of egresses participating in communicating the packet context and/or a rate at which packets are departing each of the plurality of egresses participating in communicating the packet context. For example, an egress metering and/or policing manager at each of the plurality of egresses participating in communicating the packet context may communicate the departure rates of packets from its corresponding egress to the global controller 110.

In another example, an attribute of an egress traffic condition may include a depth statistic of an egress queues at each of the egresses of the plurality of egresses participating in communicating the packet context. A depth statistic of an egress queue may include the amount of packets arriving at an egress queue, the amount of packets in an egress queue, an amount of data present in an egress queue, an amount of space in an egress queue occupied by packets, an amount of space remaining available to be occupied by a packets in the egress queue, a state of the egress queue, a rate at which the egress queue is filling or emptying of packets, the amount of packets that are departing an egress queue, an arrival rate of a packet flow context at an egress queue, and a departure rate of a packet flow context from the egress queue, etc. In this manner, the global controller 110 may determine, from the egress rate attribute, the rate at which each of a plurality of egresses of a network is processing packets through their egress queue. The global controller 110 may, based on the egress rate attribute, determine not only the current depth of the queues, but also trends and rates of change in the queue depths.

The global controller 110 may determine a rate of traffic communication at each of the plurality of egresses participating in the communication of the packet flow associated with the packet 104. The global controller 110 may determine the rate of traffic communication based on an initial measurement of an attribute of an egress traffic condition received from each of the plurality of egresses and an updated measurement of the attribute of the egress received a period of time after the initial measurement of the attribute of the egress traffic condition is received, The rate of traffic communication at each of the plurality of egresses may be a combination of and/or calculated from the above-outlined examples of attributes of egress traffic. That is, the global controller 110 may utilize the above-outlined examples of attributes of egress traffic conditions to compile and/or calculate an rate of traffic communication for each of the plurality of egresses participating in the communication of the packet context that is indicative of the overall state of each of the plurality of egresses participating in the communication of the packet context in addition to their associated constituent components. In this manner, the rate of traffic communication may characterize a rate at which packets are arriving at each of the plurality of egresses, the rate at which packets are being placed into egress queues at each of the plurality of egresses, the depth of the egress queues at each of the plurality of egresses, and/or the rate at which the packets are departing at each of the plurality of egresses, thereby providing a metric of the conditions at the plurality of egresses overall. The rate of traffic communication may not only describe the current state of each of the plurality of egresses but also trends and predictions in the processing of packets by each of the plurality of egresses.

The global controller 110 may determine a target packet admission rate applicable to each of the plurality of ingresses participating in the communication of the packet flow context. The target packet admission rate may include a target rate of packet admission to an ingress queue applicable to of each of the plurality of ingresses. For example, the target packet admission rate may include a target rate or amount of data or packets for an ingress admission manager 112 to admit to its corresponding ingress. A target rate may be utilized by the ingress admission manager 112 as a portion of a definition of an amount of data to be admitted to its corresponding ingress per period of time.

The target packet admission rate may provide a full utilization of traffic flow capacity for the system 100 without creating a traffic backlog leading to delays in delivering packets and/or dropped packets.

In some examples, the target packet admission rate may be based on the attributes of ingress traffic conditions of substantially all the plurality of ingresses participating in the communication of the packet flow context in a network and the attributes of egress traffic conditions of substantially all the plurality of egresses participating in the communication of the packet flow context in a network. In some examples, the target packet admission rate may be based on the attributes of ingress traffic conditions of a portion of the plurality of ingresses participating in the communication of the packet flow context in a network and a portion of the attributes of egress traffic conditions of the plurality of egresses participating in the communication of the packet flow context in a network.

In some examples, the global controller 110 may determine the target packet admission rate based on the global data collected from the plurality of ingresses and egresses participating in the communication of the packet flow context in a network, but may not specifically consider the conditions local and specific to the individual ingress 102 that the target packet admission rate is being published to. Rather, the target packet admission rate may serve as an indication as to what the conditions are like overall in the network and provide a broad-based view of conditions downstream to the ingress 102 in the potential traffic path of a packet 104. As such, the target packet admission rate may be considered a communication of the global data. That is, the target packet admission rate may be a communication of a compilation of the global data providing an ingress 102 making a packet admission decision with a global view of traffic conditions in a format and at a cadence that ameliorates a computational burden associated with persistently collecting and maintaining raw global data at the ingress 102 making the packet admission decision.

The target packet admission rate may be generically applicable to the plurality of ingresses participating in the communication of the packet flow context. Alternatively, the target packet admission rate may be specific to each individual ingress participating in the communication of the packet flow context. That is, the target packet admission rate may be determined to be a target rate of packet admission for a particular packet flow context and/or a particular ingress queue correlated with a particular egress 106 identified as participating in the communication of the packet flow. As such, the global controller 110 may determine for each packet flow context and/or each of the plurality of ingresses, an applicable target packet admission rate.

The target packet admission rates may be calculated and published and/or communicated periodically to each ingress of the plurality of ingresses participating in the communication of the packet flow context. For example, the target packet admission rate may be calculated and/or published by the global controller 110 at a slower or less frequent data collection and/or communication cadence than a VoQ control loop utilizing persistent and/or substantially real-time polling of ingress or egress states. That is, the cadence of calculating and/or publishing the target packet admission rate to each ingress of the plurality of ingresses participating in the communication of the packet flow context may be less frequent than a VoQ control loop providing persistent substantially real-time updates of conditions such as queue depth at other ingresses or egresses. The slower cadence may provide for reduced bandwidth consumption associated with communicating the measurement updates across the network and eliminating the strain on processing and/or storing resources in the network to rapidly and persistently process the persistent substantially real-time updates of state information.

In an example, the global controller 110 may calculate and/or publish an updated target packet admission rate every multiple millisecond to multiple second time period. Where VoQ control loops may have continuously updated and consumed network bandwidth by providing substantially real time state data to ingresses and egresses, the global controller 110 may compile and manipulate state data and publish target packet admission rates less frequently to conserve bandwidth on the network. Additionally, the target packet admission rate may represent a more comprehensive representation of the conditions at various ingresses and egresses throughout a network. That is, rather than just a substantially real-time snapshot of the instantaneous state of a queue at an ingress or an egress, the global controller 110 may calculate a target packet admission rate based on rates, trends, extrapolations, and/or predictions of the conditions at the ingresses and egresses providing a more responsive and predictive means of engineering network traffic.

The ingress admission manager 112 at each ingress 102 may receive the target packet admission rate published to it by the global controller 110. The ingress admission manager 112 may determine whether a packet 104 is admitted to an ingress 102 and/or an ingress queue of the ingress. That is, the ingress admission manager 112 may analyze the incoming packet 104 and determine whether to admit the packet 104 to an ingress queue or to drop the packet 104.

The ingress admission manager 112 may determine whether a particular packet 104 is admitted to an ingress queue based on the target packet admission rate published to the ingress 102. Additionally, the ingress admission manager 112 may determine whether the packet 104 is admitted to an ingress queue based on the local attributes of an ingress traffic condition that are local to the ingress 102 accepting the packet 104. That is, since the target packet admission rate published to the ingress 102 does not include or necessarily consider the conditions specific to the ingress 102 or the ingress queue admitting the packet 104, the ingress admission manager 112 may additionally include the local attributes of an ingress traffic condition in its determination of whether to admit the packet 104 to an ingress queue.

The ingress admission manager 112 may determine, based on the target packet admission rate and the local attributes of an ingress traffic condition, a likelihood that a packet 104 with a packet flow context will reach a destination and or an effect that admitting the packet 104 with the packet flow context will have on other packets with the packet flow context in the network reaching their destination in a manner that satisfies a parameter defined by a network standard (quality of service specification, etc.). In an example, if admitting the packet 104 to a particular ingress queue will result in the likelihood of the packet reaching its destination within a satisfactory period of time exceeding a threshold, then the ingress admission manager 112 may admit the packet 104 to the ingress queue. However, if admitting the packet 104 to the particular ingress queue will result in the likelihood of the packet reaching its destination within a satisfactory period of time falling below a threshold, then the ingress admission manager 112 may cause the packet 104 to be dropped and/or admitted to a different ingress queue. Likewise, if admitting the packet 104 to the particular ingress decreases the likelihood of another packet reaching its destination, then the ingress admission manager 112 may cause the packet 104 to be dropped and/or admitted to a different ingress queue. In some examples, a priority assigned to the packet 104 and/or a priority assigned to the other packet being affected may be considered in determining whether to admit the packet 104 to an ingress queue. Additionally, as described above, the packet 104 may include a packet flow and/or be a portion of a packet flow. As such, the ingress admission manger 112 may determine, based on the target packet admission rate and the local attribute of an ingress traffic condition, whether to admit a packet 104 to an ingress queue based on a likelihood that substantially an entire a packet flow will arrive at a destination node.

In this manner, a decision of how to handle a packet 104 at the ingress 102 may be determined based on conditions of the ingress 102, conditions of the interconnect fabric 108-1 . . . 108-N, conditions in remote egresses and ingresses across a packet-switched network, and trends of all the above based on the conditions. The system 100 may allow packet handling decisions to holistic, predictive, and adaptable without utilizing portions of bandwidth to persistently communicate rate and/or trend agnostic state information into VoQ control loops.

In some examples the ingress admission manager 112 may assign different weights to the local attributes of an ingress traffic condition than the target packet admission rates when determining whether to admit a packet 104 to an ingress queue. For example, the ingress admission manager 112 may weight the local attributes of an ingress traffic condition more heavily thereby making the determination of whether to admit the packet 104 more dependent on the local attributes of an ingress traffic condition than the target packet admission rate. In this manner, the system 100 may produce a stable control loop utilizing the less frequently updated and provided data from the global controller 110 rather than the conditions monitored at the ingress 102. Additionally, the system 100 may provide a stable control loop in the presence of a global controller 110 stall and/or fault or other change in the performance of the global controller 110 by weighting the local attributes of an ingress traffic condition more heavily to avoid reliance on potentially out-of-date data. Likewise, system 100 may also remain stable in the presence of a topology change in the overall network.

Additionally, the system 100 may allow for increased granularity relative to a physical VoQ or ingress or egress queue since packet flows 104 may be assigned a flow context with associated ingress and/or egress meters and counters based on various characteristics. Multiple flow contexts may share a single physical ingress queue, egress queue, and/or buffer.

Furthermore, the system 100 may provide a diverse and/or topology agnostic means of network traffic engineering. For example, the ingress admission manager 112 and global controller 110 may be utilized in various network topologies rather than just symmetric distributed crossbar or Clos networks. For example, the ingress admission manager 112 and global controller 110 may be utilized to engineer network traffic in Ethernet switching and unscheduled Ethernet fabric networks with various topologies. In contrast to unscheduled networks, the ingress admission manager 112 and global controller 110 may be utilized to engineer network traffic in a manner that incorporates an awareness of distant, remote, and removed topological congestion in the network when assigning a communication path for a packet 104 and/or dropping or admitting a packet 104. As such, utilizing the ingress admission manager 112 and global controller 110 to engineer network traffic may provide relatively higher ad hoc interconnect fabric 108-1 . . . 108-N utilization, prioritization, and network access fairness across an entire fabric of a network.

Figure 1B:
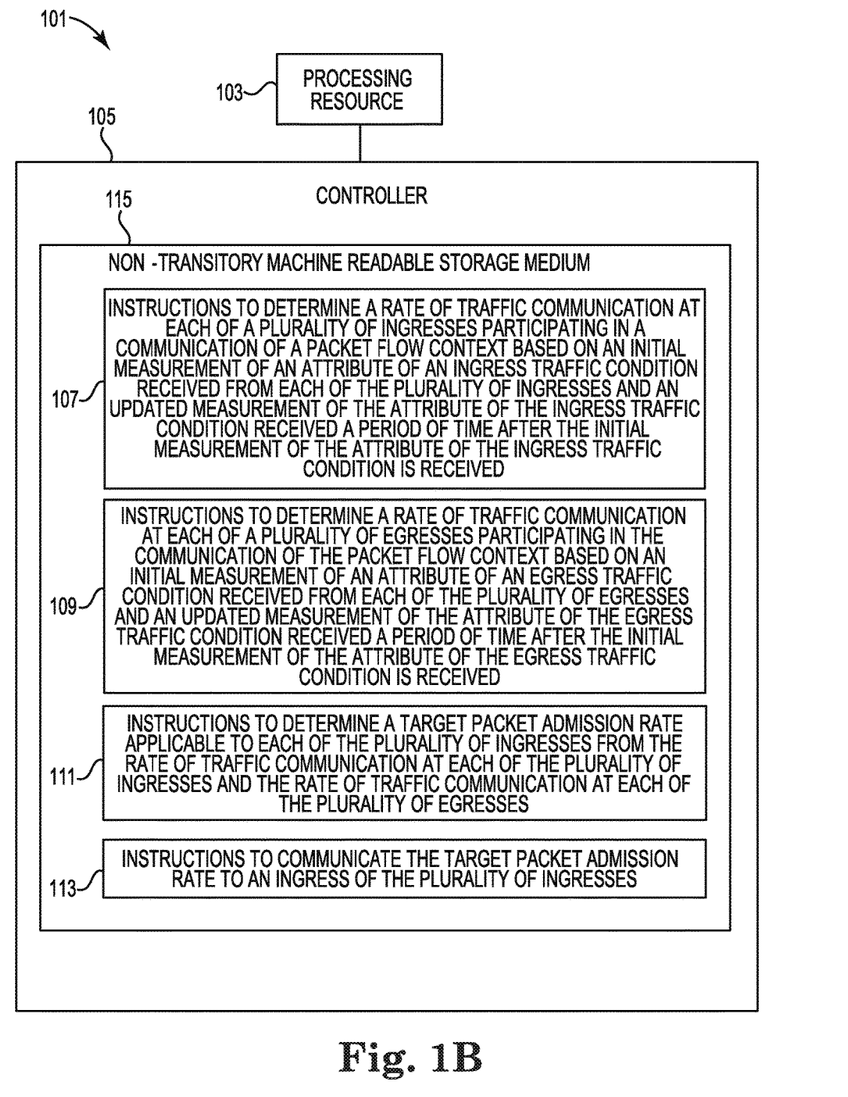
FIG. 1B illustrates an example of a system for packet admission consistent with the disclosure.

FIG. 1B illustrates an example of a system 101 for packet admission consistent with the disclosure. The system 101 may include a processing resource 101 and a controller 105. The controller 105 may be a portion of a network traffic controller. The controller 105 may be, for example, a portion of the global controller 110, discussed in FIG. 1. The controller 105 may include a non-transitory computer-readable storage medium 115. The memory resource, such as the non-transitory machine readable medium 115, may be used to store instructions (e.g., 107, 109, 111, 113, etc.) executed by the processing resource 103 to perform the operations as described herein. The processing resource 103 may execute the instructions stored on the non-transitory machine readable medium 115. The non-transitory machine readable medium 115 may be any type of volatile or non-volatile memory or storage, such as random access memory (RAM), flash memory, read-only memory (ROM), storage volumes, a hard disk, or a combination thereof.

The example medium 115 may store instructions 107 executable by the processing resource 103 to determine a rate of traffic communication at each of a plurality of ingresses participating in a communication of a packet flow context based on an initial measurement of an attribute of an ingress traffic condition received from each of the plurality of ingresses and an updated measurement of the attribute of the ingress traffic condition received a period of time after the initial measurement of the attribute of the ingress traffic condition is received.

The example medium 115 may store instructions 109 executable by the processing resource 103 to determine a rate of traffic communication at each of a plurality of egresses participating in the communication of the packet flow context based on an initial measurement of an attribute of an egress traffic condition received from each of the plurality of egresses and an updated measurement of the attribute of the egress traffic condition received a period of time after the initial measurement of the attribute of the egress traffic condition is receive.

The example medium 115 may store instructions 111 executable by the processing resource 103 to determine a target packet admission rate applicable to each of the plurality of ingresses from the rate of traffic communication at each of the plurality of ingresses and the rate of traffic communication at each of the plurality of egresses.

The example medium 115 may store instructions 113 executable by the processing resource 103 to communicate the target packet admission rate to an ingress of the plurality of ingresses.

Figure 2:
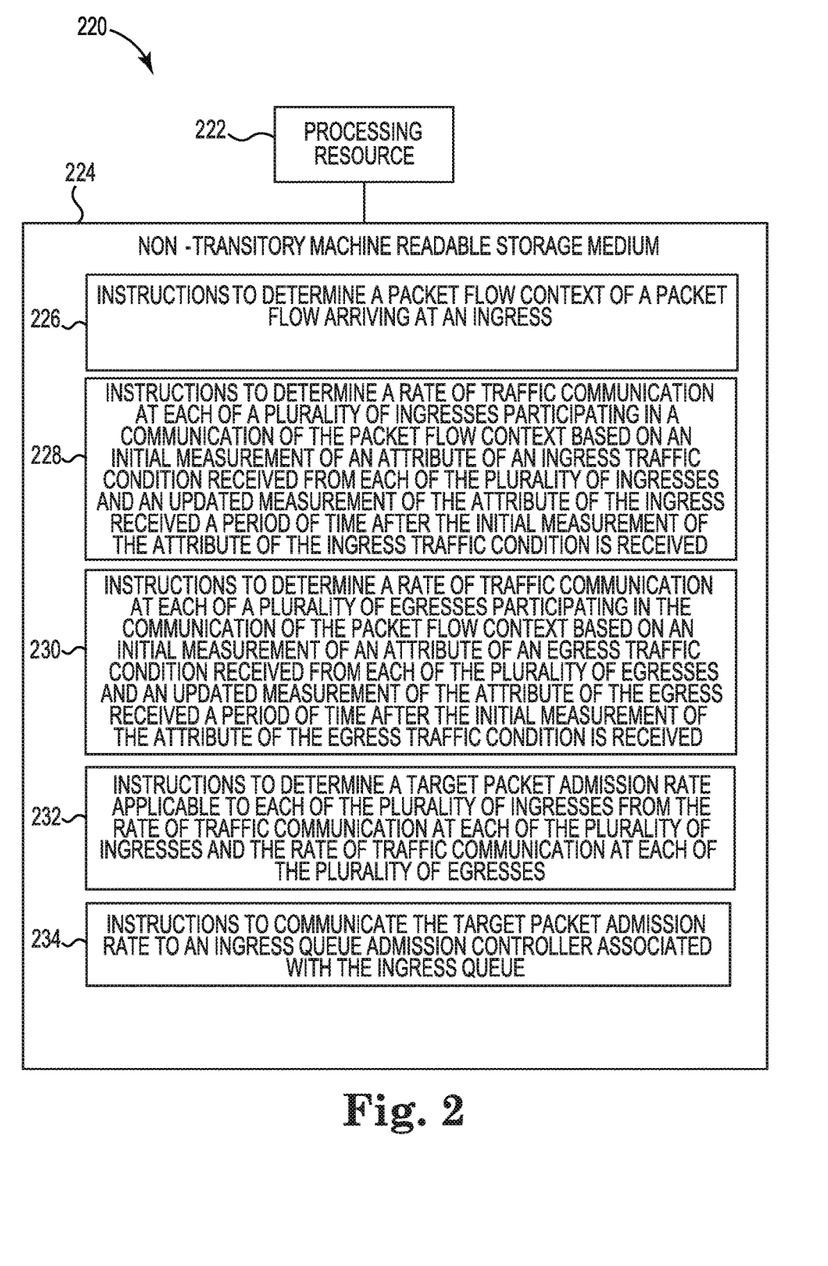
FIG. 2 illustrates a diagram of an example of a processing resource and a non-transitory computer readable medium for packet admission consistent with the disclosure.

FIG. 2 illustrates a diagram 220 of an example of a processing resource 222 and a non-transitory machine readable medium 224 network packet admission consistent with the disclosure. A memory resource, such as the non-transitory machine readable medium 224, may be used to store instructions (e.g., 226, 228, 230, 232, 234) executed by the processing resource 222 to perform the operations as described herein. A processing resource 222 may execute the instructions stored on the non-transitory machine readable medium 224. The non-transitory machine readable medium 224 may be any type of volatile or non-volatile memory or storage, such as random access memory (RAM), flash memory, read-only memory (ROM), storage volumes, a hard disk, or a combination thereof.

The example medium 224 may store instructions 226 executable by the processing resource 222 to determine a context of a packet flow arriving at an ingress of a plurality of ingresses in a network. The packet flow may be a candidate for admission to an ingress queue associated with the ingress of the plurality of ingresses. The ingress queue may be a virtual output queue. The virtual output queue may include buffer storage space for packets with a common egress destination. The ingress queue may be utilized to hold packets prior to scheduling and communication of the packets across an interconnect fabric to an egress.

Determining a context of a packet flow may include determining an identifying characteristic or type of a packet or packet flow arriving at an ingress. The context of the packet flow may be determined based on analysis of packet header information such as source address, destination address, protocol, source port, destination port, packet length. The context of the packet flow may be determined based on analysis of connection state information such as which ports are being opened for a particular connection related to communicating the packet. The context of the packet flow may be determined based on analysis of transmission control protocol and Internet protocol fragmentation data including fragments and sequence numbers associated with the packet. The context of the packet flow may be determined based on analysis of reassembly of the packets of a packet flow, application type associated with the packets, and context verification to verify that the packet belongs to a specific communication session. The context of the packet flow may be determined based on analysis of Layer 2 information such as virtual local area network identification and/or a media access control address. The context of the packet flow may be determined based on analysis of a date and a time of arrival or departure of the packet.

The example medium 224 may store instructions 228 executable by the processing resource 222 to determine a rate of traffic communication at each of a plurality of ingresses participating in a communication of the packet flow context. The plurality of ingresses may be located across a plurality of network devices. For example, the plurality of ingresses may be located across a plurality of network switches. The plurality of network devices may have distinct network topologies. For example, a first network device of the plurality may have a first network topology and a second network device of the plurality may have a second network topology. In an example, the first and second network devices may be a part of an ad hoc distributed network of switched. The independent first and second network switched may be made by distinct vendors and the topology of the connections between the network devices may be distinct and varied.

The rate of traffic communication at each of the plurality of ingresses may be determined based on an initial measurement of an attribute of an ingress traffic condition received from each of the plurality of ingresses and an updated measurement of the attribute of the ingress received a period of time after the initial measurement of the attribute of the ingress traffic condition is received.

The rate of traffic communication at each of the plurality of ingresses may include an arrival rate of packets at each of the plurality of ingresses. The rate of traffic communication at each of the plurality of ingresses may include a rate of change of an ingress queue state at each of the plurality of ingresses. The rate of traffic communication at each of the plurality of ingresses may include a departure rate of packets from each of the plurality of ingresses.

The example medium 224 may store instructions 230 executable by the processing resource 222 to determine a rate of traffic communication at each of a plurality of egresses participating in the communication of the packet flow context. The plurality of egresses may also be located across a plurality of network devices.

The rate of traffic communication at each of a plurality of egresses may be determined based on an initial measurement of an attribute of an egress traffic condition received from each of the plurality of egresses and an updated measurement of the attribute of the egress received a period of time after the initial measurement of the attribute of the egress traffic condition is received.

The rate of traffic communication at each of a plurality of egresses may include an arrival rate of packets at each of the plurality of egresses. The rate of traffic communication at each of a plurality of egresses may include a rate of change in an egress queue state at each if the plurality of egresses. The rate of traffic communication at each of a plurality of egresses may include a departure rate of packets at each of the plurality of egresses.

The example medium 224 may store instructions 232 executable by the processing resource 222 to determine a target packet admission rate. The target packet admission rate may be a recommended rate applicable to each of the plurality of ingresses in determining whether to admit a packet of a packet flow context. The target packet admission rate may be determined from the rate of traffic communication at each of the plurality of ingresses participating in a communication of the packet flow context and the rate of traffic communication at each of the plurality of egresses participating in a communication of the packet flow context.

In addition to the rate of traffic communication at each of the plurality of ingresses participating in a communication of the packet flow context and the rate of traffic communication at each of the plurality of egresses participating in a communication of the packet flow context, the target packet admission rate may be determined based on a fabric state attribute of an interconnect fabric of the network participating in communicating the packet flow context. The fabric state attribute may be determined from both the plurality of ingresses and the plurality of egresses. For example, an amount of utilization or congestion of the interconnect fabric may be determined by the activities of an ingress scheduler on each of the plurality of ingresses. The amount of packets that are being scheduled and communicated by the ingress scheduler may be utilized as an indication of the amount of traffic on the interconnect fabric. Additionally, the rate of arrival and departure at the egress may compliment the ingress scheduler data to provide an overall reading of the amount of traffic on the interconnect fabric.

The example medium 224 may store instructions 234 executable by the processing resource 222 to communicate the target packet admission rate. Communicating the target packet admission rate may include periodically publishing the target packet admission rate to an ingress queue admission controller associated with an ingress queue of the ingress where the packet has arrived and is awaiting admission to the ingress queue. The ingress queue admission controller may be a component of the ingress that utilizes the target packet admission rate, constructed from global data, along with rates and/or attributes of an ingress traffic condition local to the ingress.

In addition to the target packet admission rate, a weight associated with the target packet admission rate may be communicated to the ingress queue admission controller. Since the ingress admission controller may make a packet admission determination based on the target packet admission rate and the rates and/or local attributes of an ingress traffic condition local to the ingress, an assignment of an amount of weight to be given to the target packet admission rate relative to the rates and/or local attributes of an ingress traffic condition local to the ingress may influence the formation of a stable loop at the ingress admission controller.

The ingress admission controller may determine whether to admit the packet flow to an ingress queue based on the target packet admission rate and the rates and/or attributes of an ingress traffic condition local to the ingress. For example, the local rates and/or attributes of an ingress traffic condition local to the ingress and the target packet admission rate may be analyzed to determine whether the packet flow is above a threshold likelihood to successfully reach its destination within an amount of time. In some examples, the local rates and/or attributes of an ingress traffic condition local to the ingress and the target packet admission rate of a plurality of different possible communication routes for a packet flow context across a network may be analyzed to determine a relatively fastest route for the packet to travel that may cause a relatively smallest likelihood of disrupting other packet flows in the network. In some examples, the local rates and/or attributes of an ingress traffic condition local to the ingress may be weighted more heavily in such an analysis than the target packet admission rate when determining whether to admit the packet flow to the ingress.

Figure 3:
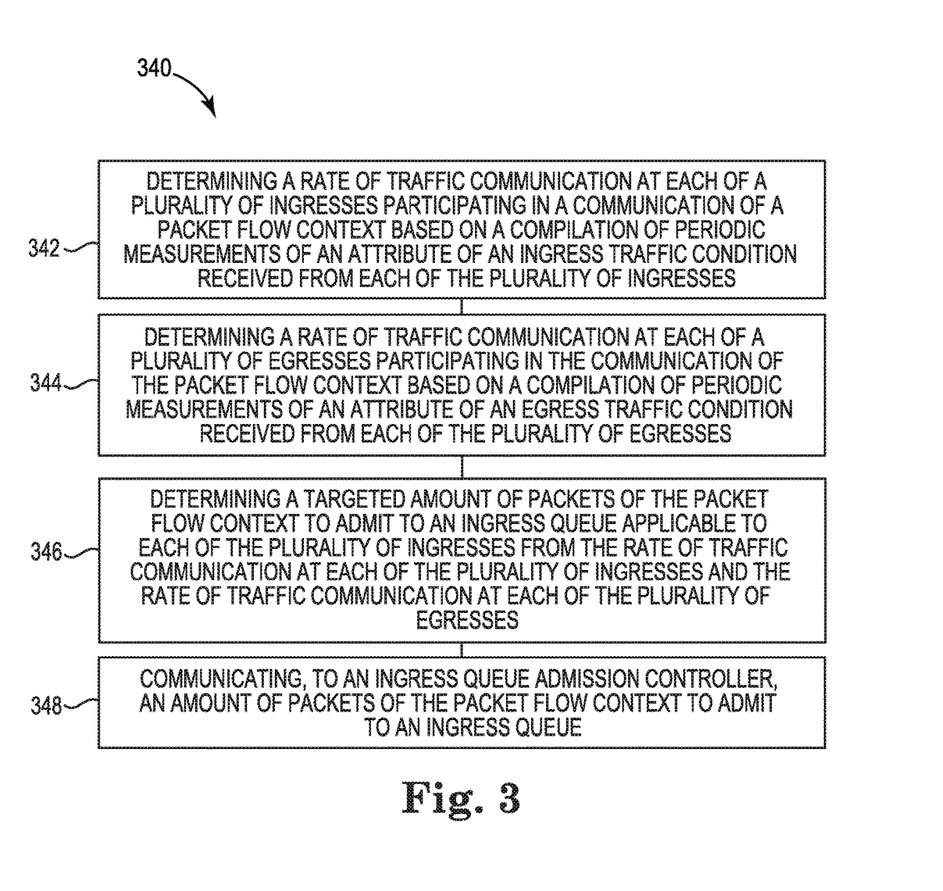
FIG. 3 illustrates a flow diagram of an example of a method for packet admission consistent with the disclosure.

FIG. 3 illustrates a flow diagram of an example of a method 340 for network packet admission consistent with the disclosure. At 342, the method 340 may include determining a rate of traffic communication at each of a plurality of ingresses participating in a communication of a packet flow context. Determining a rate of traffic communication at each of a plurality of ingresses participating in a communication of a packet flow context may include determining a rate of traffic communication at an ingress where a packet as arrived and where an ingress admission controller may decide whether to admit the packet to the ingress as described below. The rate of traffic communication at each of the plurality of ingresses may be determined based on a compilation of periodic measurements of an attribute of an ingress traffic condition received from each of the plurality of ingresses. The periodic measurements of an attribute of an ingress traffic condition may be compiled at a controller remote from the plurality of ingresses. For example, the controller may collect state information every several seconds from each of the plurality of ingresses participating in a communication of a packet flow context within a network. Determining a rate of traffic communication at each of a plurality of ingresses participating in a communication of a packet flow context may include determining rate and/or trend information related to the states of the policing and metering components, ingress queue components, and/or ingress scheduler components of each of the plurality of ingresses.

At 344, the method 340 may include determining a rate of traffic communication at each of a plurality of egresses participating in a communication of a packet flow context. The rate of traffic communication at each of the plurality of egresses may be determined based on a compilation of periodic measurements of an attribute of an egress traffic condition received from each of the plurality of egresses. The periodic measurements of an attribute of an egress traffic condition may be compiled at a controller remote from the plurality of egresses. For example, the controller may collect state information every several seconds from each of the plurality of egresses participating in a communication of a packet flow context within a network. Determining a rate of traffic communication at each of a plurality of egresses participating in a communication of a packet flow context may include determining rate and/or trend information related to the states of the egress arrival components, egress queue components, egress scheduler components, and/or egress policing or metering components of each of the plurality of egresses.

At 346, the method 340 may include determining a targeted amount of packets of the packet flow context to admit to an ingress queue. The targets amount of the packets of the packet flow context may be applicable to each of the plurality of ingresses. For example, each of the plurality of ingresses may apply the targeted amount of packets of the packet flow context in deciding whether to admit an arriving packet to an ingress queue. The targeted amount of packets may be determined from the rate of traffic communication at each of the plurality of ingresses and the rate of traffic communication at each of the plurality of egresses.

Additionally, an amount of fabric congestion across a network may be determined based on the compilation of periodic measurements of the attribute of the ingress traffic condition and the compilation of periodic measurements of the attribute of the egress traffic condition. The likelihood of whether a packet of the packet flow context will reach a destination may be determined based on the determined amount of traffic congestion. Further, the likelihood that a packet of the packet flow context entering the network will prevent a communication of another packet in the network may be determined based on the determined amount of traffic congestion. The likelihoods may be utilized to generate a recommendation to an ingress queue admission controller regarding how a packet arriving at the ingress should be treated (e.g., allowed to enter the ingress queue, dropped from the ingress, rerouted to another ingress, etc.).

At 348, the method 340 may include communicating, to an ingress queue admission controller, an amount of packets of the packet flow context to admit to an ingress queue. The ingress queue admission controller may apply the targeted amount of packets of the packet flow context in deciding whether to admit an arriving packet to an ingress queue.

In some examples, a likelihood of whether a packet at the ingress of the plurality of ingresses will reach a destination based on targeted amount of packets of the packet flow context to admit to an ingress queue and based on a local attribute of an ingress traffic condition collected by the ingress admission controller. The ingress admission controller may collect and analyze the targeted amount of packets of the packet flow context to admit to an ingress queue for the packet flow context and the local attribute of an ingress traffic condition for the packet flow context to determine a likelihood of a packet, if admitted to an ingress, reaching its addressed destination within a period of time and without interfering with or preventing the delivery of another packet flow context. That is, the ingress admission controller may analyze the targeted amount of packets of the packet flow context to admit to an ingress queue and the local attribute of an ingress traffic condition for the packet flow context to determine the statistical probability that admitting a packet to a particular ingress queue will result in a successful and timely delivery of the packet to a destination without degrading network performance beyond a threshold performance level.

If it is determined that the likelihood of a packet admitted to an ingress queue will reach the destination within a period of time exceeds a likelihood threshold, then the packet may be admitted to the ingress queue by the ingress admission controller. If, however, if is determined that the likelihood of a packet admitted to an ingress queue will reach the destination within a period of time falls below the likelihood threshold, then the packet may be dropped at the ingress and/or routed to another ingress or ingress queue. In addition to determining if a packet will reach a destination within a period of time, effect of admitting the packet to an ingress queue on another packet in the network may be determined. The effect of admitting the packet to the ingress queue on other packets in the network may be used to determine whether to admit, drop, or reroute a packet arriving at an ingress. For example, if admitting a first packet to an ingress queue will prevent a second, higher priority, packet from reaching its destination within a period of time, then the first packet may be dropped or rerouted to a different ingress or ingress queue.

In the foregoing detailed description of the disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the disclosure, A "plurality of" is intended to refer to more than one of such things.

The figures herein follow a numbering convention in which the first digit corresponds to the drawing figure number and the remaining digits identify an element or component in the drawing. For example, reference numeral 102 may refer to element "02" in FIG. 1A. Elements shown in the various figures herein can be added, exchanged, and/or eliminated so as to provide a number of additional examples of the disclosure. In addition, the proportion and the relative scale of the elements provided in the figures are intended to illustrate the examples of the disclosure, and should not be taken in a limiting sense. Further, as used herein, "a", "a number of", and/or "a plurality of" an element and/or feature can refer to one or more of such elements and/or features.

What is claimed:

1. A system comprising:
a processing resource; and
a controller including a memory resource storing instructions executable by the processing resource to:
determine a rate of traffic communication at each of a plurality of ingresses participating in a communication of a packet flow context based on an initial measurement of an attribute of an ingress traffic condition received from each of the plurality of ingresses and an updated measurement of the attribute of the ingress traffic condition received a period of time after the initial measurement of the attribute of the ingress traffic condition is received;
determine a rate of traffic communication at each of a plurality of egresses participating in the communication of the packet flow context based on an initial measurement of an attribute of an egress traffic condition received from each of the plurality of egresses and an updated measurement of the attribute of the egress traffic condition received a period of time after the initial measurement of the attribute of the egress traffic condition is received;
determine a target packet admission rate applicable to each of the plurality of ingresses from the rate of traffic communication at each of the plurality of ingresses and the rate of traffic communication at each of the plurality of egresses; and
communicate the target packet admission rate to an ingress of the plurality of ingresses.

2. The system of claim 1, wherein the attribute of the ingress includes an arrival rate of a packet flow at a corresponding ingress of the plurality of ingresses.

3. The system of claim 1, wherein the attribute of the ingress includes a depth of an ingress queue at a corresponding ingress of the plurality of ingresses.

4. The system of claim 1, wherein the attribute of the ingress includes a departure rate of a packet flow from a corresponding ingress of the plurality of ingresses.

5. The system of claim 1, wherein the attribute of the ingress includes an amount of fabric utilization determined local to a corresponding ingress of the plurality of ingresses.

6. The system of claim 1, wherein the target packet admission rate includes a target rate of packet admission to an ingress queue of each of the plurality of ingresses.

7. The system of claim 6, wherein the target packet admission rate is published to each of the plurality of ingresses at a multiple second update rate.

8. The system of claim 1, wherein the attribute of the egress includes an arrival rate of a packet flow at a corresponding egress of the plurality of ingresses.

9. The system of claim 1, wherein the attribute of the egress includes a departure rate of a packet flow departure at a corresponding egress of the plurality of the egresses.

10. The system of claim 1, wherein the attribute of the egress includes an arrival rate of a packet flow at an egress queue associated with a corresponding egress and a departure rate of a packet flow from the egress queue.

11. A non-transitory computer-readable medium containing instructions executable by a processing resource to cause the processing resource to:
  determine a packet flow context of a packet flow arriving at an ingress;
  determine a rate of traffic communication at each of a plurality of ingresses participating in a communication of the packet flow context based on an initial measurement of an attribute of an ingress traffic condition received from each of the plurality of ingresses and an updated measurement of the attribute of the ingress received a period of time after the initial measurement of the attribute of the ingress traffic condition is received;
  determine a rate of traffic communication at each of a plurality of egresses participating in the communication of the packet flow context based on an initial measurement of an attribute of an egress traffic condition received from each of the plurality of egresses and an updated measurement of the attribute of the egress received a period of time after the initial measurement of the attribute of the egress traffic condition is received;
  determine a target packet admission rate applicable to each of the plurality of ingresses from the rate of traffic communication at each of the plurality of ingresses and the rate of traffic communication at each of the plurality of egresses; and
  communicate the target packet admission rate to an ingress queue admission manager associated with an ingress queue of the ingress.

12. The non-transitory computer readable medium of claim 11, including instructions executable to communicate a weight associated with the target packet admission rate to the ingress queue admission manager.

13. The non-transitory computer readable medium of claim 11, wherein the plurality of ingresses participating in the communication of the packet flow context are located across a plurality of network devices.

14. The non-transitory computer readable medium of claim 13, wherein a first network device of the plurality of network devices and a second network device of the plurality of network devices have distinct network topologies.

15. The non-transitory computer readable medium of claim 11, wherein the ingress queue is a virtual output queue.

16. The non-transitory computer readable medium of claim 15, wherein the virtual output queue includes a buffer for packets with a common egress destination.

17. A method comprising:
  determining, by a processing resource, a rate of traffic communication at each of a plurality of ingresses participating in a communication of a packet flow context based on a compilation of periodic measurements of an attribute of an ingress traffic condition received from each of the plurality of ingresses;
  determining, by the processing resource, a rate of traffic communication at each of a plurality of egresses participating in the communication of the packet flow context based on a compilation of periodic measurements of an attribute of an egress traffic condition received from each of the plurality of egresses;
  determining, by the processing resource, a target amount of packets of the packet flow context to admit to an ingress queue applicable to each of the plurality of ingresses from the rate of traffic communication at each of the plurality of ingresses and the rate of traffic communication at each of the plurality of egresses; and
  communicating, by the processing resource to an ingress queue admission manager, an amount of packets of the packet flow context to admit to an ingress queue.

18. The method of claim 17, comprising determining, by the processing resource, an amount of fabric congestion across a network based on the compilation of periodic measurements of the attribute of the ingress traffic condition and the compilation of periodic measurements of the attribute of the egress traffic condition.

19. The method of claim 18, determining, by the processing resource, a likelihood of whether a packet of the packet flow context will reach a destination based on the amount of traffic congestion.

20. The method of claim 18, comprising determining, by the processing resource, a likelihood that a packet of the packet flow context entering the network will prevent a communication of another packet in the network based on the amount of traffic congestion.

* * * * *